United States Patent
Fukushima et al.

[11] Patent Number: 5,991,688
[45] Date of Patent: Nov. 23, 1999

[54] ROUTE SETTING METHOD AND APPARATUS IN NAVIGATION SYSTEM, AND PROGRAM STORAGE DEVICE READABLE BY THE APPARATUS

[75] Inventors: Atsuhiko Fukushima; Yukiko Habu, both of Kawagoe, Japan

[73] Assignee: Pioneer Electronic Corporation, Japan

[21] Appl. No.: 08/841,580

[22] Filed: Apr. 30, 1997

[30] Foreign Application Priority Data

May 2, 1996 [JP] Japan .................................... 8-111704

[51] Int. Cl.⁶ .................................................. G01C 21/20
[52] U.S. Cl. ........................................ 701/209; 701/201
[58] Field of Search ................................ 701/201, 209, 701/210; 340/995

[56] References Cited

U.S. PATENT DOCUMENTS

| | | | |
|---|---|---|---|
| 5,243,528 | 9/1993 | Lefebvre ............................. | 364/449 |
| 5,291,413 | 3/1994 | Tamai et al. . | |
| 5,291,414 | 3/1994 | Tamai et al. ........................ | 364/449 |
| 5,450,343 | 9/1995 | Yurimoto et al. ................... | 364/449 |
| 5,550,538 | 8/1996 | Fujii et al. .......................... | 340/995 |
| 5,559,511 | 9/1996 | Ito et al. ............................. | 340/995 |
| 5,652,706 | 7/1997 | Morimoto et al. .................. | 364/449.4 |
| 5,684,704 | 11/1997 | Okazaki ............................. | 364/444.2 |
| 5,689,423 | 11/1997 | Sawada .............................. | 364/444.2 |
| 5,712,788 | 1/1998 | Liaw et al. ......................... | 364/449.3 |

FOREIGN PATENT DOCUMENTS

| | | |
|---|---|---|
| 0 348 528 | 1/1990 | European Pat. Off. . |
| 0 580 167 | 1/1994 | European Pat. Off. . |

*Primary Examiner*—Michael J. Zanelli
*Attorney, Agent, or Firm*—Nixon & Vanderhye

[57] ABSTRACT

A route setting method for use in a navigation system for navigating a movable body is provided with a process area setting process of setting a process area, which corresponds to a present position of the movable body, includes a plurality of route points and has a size based on a performance of a recovery route searching process, in case that the present position of the movable body does not exist on a set route from an original departure point to a final destination point. The set route includes the route points and is set in advance. The route setting method is also provided with: a route point searching process of searching a closest route point, which is the closest to the final destination point among the route points on a boundary of or within the set process area; and the recovery route searching process of searching a recovery route from the present position of the movable body to the searched closest route point.

13 Claims, 9 Drawing Sheets

| | CANDIDACY LINK | CONFIRMED LINK |
|---|---|---|
| S1 | 1 (0,1)<br>2 (0,2) | 1 (0,1) |
| S2 | 2 (0,2)<br>4 (1,3) | 2 (0,2) |
| S3 | 4 (1,3)<br>6 (2,6) | 4 (1,3) |
| S4 | 6 (2,6)<br>8 (4,4) | 8 (4,4) |
| S5 | 6 (2,6)<br>12 (8,5)<br>14 (8,5) | 12 (8,5) |
| S6 | 6 (2,6)<br>14 (8,5)<br>9 (12,9) | 14 (8,5) |
| S7 | 6 (2,6)<br>9 (12,9) | 6 (2,6) |
| S8 | 9 (12,9)<br>10 (6,7) | 10 (6,7) |
| S9 | 9 (12,9)<br>11 (10,8)<br>13 (10,8) | 11 (10,8) |
| S10 | 9 (12,9)<br>13 (10,8)<br>7 (11,10) | 13 (10,8)<br>ARRIVE AT G, HERE |

DEFINITION OF LINK NUMBERS 0
1 A→B
2 A→C
3 B→A
4 B→D
5 C→A
6 C→E
7 D→B
8 D→F

ROUTE SETTING METHOD AND APPARATUS IN NAVIGATION SYSTEM, AND PROGRAM STORAGE DEVICE READABLE BY THE APPARATUS

BACKGROUND OF THE INVENTION

1. Field of the Invention

The present invention relates to a route setting method of and a route setting apparatus for setting a route so as to speedily reach a destination set in advance, for use in a navigation system.

2. Description of the Related Art

There is a so-called navigation apparatus, which displays a map including a position where a movable body in various kinds such as an automobile, an airplane, a ship etc., is currently located, and further superimposes a position mark indicating a position of the movable body at the currently located position on the displayed map, so as to perform a route guidance or navigation to the destination on the basis of the display. Among the navigation apparatuses, as on-vehicle navigation apparatuses which are mounted on vehicles or auto-mobiles, there is a self-sustained or built-in type navigation apparatus and a GPS (Global Positioning System) type navigation apparatus as rough categories.

The former is a navigation apparatus, which obtains a moving direction and a moving distance of the movable body by use of a speed sensor, an angular speed sensor etc. equipped in or built in the pertinent vehicle, adds them with respect to a standard position so as to calculate the present position, and displays the present position mark and the corresponding map on the display picture plane on the basis of the calculated present position.

On the other hand, the latter is a navigation apparatus, which receives electric waves from a plurality of GPS satellites launched in the space, calculates the present position of the movable body by means of a 3-dimensional measuring method or a 2-dimensional measuring method on the basis of the electric wave reception results, and displays the present position mark and the corresponding map on the display picture plane on the basis of the calculated present position.

Further, there is an on-vehicle navigation apparatus provided with both functions of the above described self-sustained type and GPS type.

According to the above explained navigation apparatus, since the user (e.g. the driver) can grasp the present position of the self vehicle and the map in the vicinity of the present position in association with each other, it is possible to reach a destination without losing his or her way even in an area where the user has never experienced.

Further, the on-vehicle navigation apparatus may have a so-called route setting function to calculate, when an original departure point and a final destination point are inputted by the user in advance, the shortest route including a plurality of route points from the original departure point to the final destination point on the basis of these inputted points, and to superimpose the calculated shortest route on the map displayed on the picture plane.

However, in the above explained route setting function, it may happen a case that the most convenient route for the user cannot bealways calculated ordisplayedas various traffic regulations such as one way traffic etc. and the road grids become complicated, which is a problem.

For example, when the movable body is deviated from the set shortest route for some reason, as a first method according to the above mentioned route setting function, a predetermined process area around the present position of the movable body as a center is set. Then, the route point, which is the closest to the present position of the movable body among the set route points within the predetermined process area, is searched, and the route is set again from the present position of the movable body so as to return or recover to the set shortest route via this searched route point. On the other hand, as a second method according to the above mentioned route setting function, setting of the shortest route itself from the present position of the movable body to the final destination point is performed again.

However, according to the above mentioned first method to recover from the deviation, in case that the distance from the route point, which is the closest to the present position of the movable body, to the final destination point is longer than the distance from the present position of the movable body to the final destination point, if the movable body is recovered onto the set shortest route via the searched route point, which is the closest to the present position of the movable body, the newly set route becomes a detour as the route to the final destination point, which is a problem. Further, according to the above mentioned second method to recover from the deviation, in case that the distance from the present position of the movable body to the final destination point is rather long, it takes a relatively long time duration to newly set the shortest route, and the movable body cannot be moved during that time duration, which is another problem. In summary, when the movable body is deviated from the shortest route, there is such a problem that the arrival to the final destination point is considerably delayed as a result of these, according to the above explained route setting function On the other hand, according to the above explained route setting function, in case that the user intends to return to the original departure point in the middle of traveling on the set shortest route, the original departure point and the final destination point on the set shortest route are simply reverted to each other. And that, the route order of the route points along the set shortest route are also reverted, and the advance direction is also reverted while the set shortest route itself is not changed. However, because of a traffic regulations such as one way traffic etc. and a new traffic jam due to the reversion of the advance direction etc., it may happen a case that this reverted originally set shortest route is not the shortest route anymore to return fastest to the original departure point, which is another problem.

SUMMARY OF THE INVENTION

It is therefore an object of the present invention to provide a route setting method of and a route setting apparatus for setting an appropriate new route in case that the self vehicle is deviated from the route set in advance or the user intends to return to the original departure point from somewhere on the route set in advance.

The above object of the present invention can be achieved by a first route setting method for use in a navigation system for navigating a movable body. The first route setting method is provided with a process area setting process of setting a process area, which corresponds to a present position of the movable body, includes a plurality of route points and has a size based on a performance of a recovery route searching process, in case that the present position of the movable body does not exist on a set route from an original departure point to a final destination point. The set route includes the route points and is set in advance. The route setting method is also provided with: a route point searching process of searching a closest route point, which is the closest to the final destination point among the route points on a boundary of or within the set process area; and the recovery route searching process of searching a recovery route from the present position of the movable body to the searched closest route point.

According to the first route setting method of the present invention, in case that the present position of the movable body does not exist on the set route, the process area, which corresponds to the present position of the movable body, includes a plurality of route points and has a size based on the performance of the recovery route searching process, is set by the process area setting process. Then, a closest route point, which is the closest to the final destination point among the route points on a boundary of or within the set process area, is searched by the route point searching process. Then, a recovery route from the present position of the movable body to the searched closest route point is searched by the recovery route searching process. Accordingly, in case that the present position of the movable body is deviated from the set route, since the recovery route from the present position of the movable body to the closest route point, which is located on the set route, is newly searched, it is possible to recover or return to the set route via the closest route point, which is closer to the final destination point than other route points located within the set process area.

Therefore, after the movable body has recovered or returned to the set route through the searched recovery route, it is possible to speedily reach the final destination point through the set route from the searched closest route point, so that the user can achieve his object more speedily.

In one aspect of the first route setting method, the process area setting process sets the process area so that a process time required for the recovery route searching process is within a predetermined range of time.

According to this aspect, since, in the process area setting process, the process area is set so that the process time required for the recovery route searching process is within a predetermined range of time, by appropriately determining the predetermined range of time based on the performance of the recovery route searching process, e.g., the data amount read out and stored at once from a memory for storing a map, the area on the map which can be covered by the recovery route setting process by just once, the road arrangement condition within the set process area and so on, it is possible to search the recovery route without causing an unnecessary time for searching the recovery route, so as to recover or return to the set route and reach the final destination point speedily in total.

In another aspect of the first route setting method, the process area setting process sets a circular area having a center thereof at the present position of the movable body, as the process area.

According to this aspect, the circular area which includes a plurality of route points and has a size based on the performance of the recovery route searching process, can be easily set by the process area setting process.

In another aspect of the first route setting method, the process area setting process includes an inputting process of inputting a command to set the process area, and sets the process area in case that the command is inputted by the inputting process.

According to this aspect, in case that the command to set the process area is inputted by the inputting process, the process area is set by the process area setting process.

In another aspect of the first route setting method, the process area setting process includes a detecting process of detecting whether or not the present position of the movable body exists on the set route, and sets the process area in case that the present position of the movable body does not exist on the set route according to a detection result of the detecting process.

According to this aspect, in case that the present position of the movable body does not exist on the set route according to the detection result of the detecting process, the process area is set by the process area setting process.

The above object of the present invention can be also achieved by a second route setting method, for use in a navigation system for navigating a movable body, of setting a return route of the movable body, which exists on a set route from an original departure point to a final destination point set in advance, from a present position of the movable body to the original departure point. The second route setting method is provided with: a destination point setting process of setting the original departure point as a new destination point; and a return route searching process of searching a return route, on which the movable body can travel, from the present position of the movable body to the set new destination point.

According to the second route setting method of the present invention, the original departure point is set as a new destination point by the destination point setting process. Then, the return route, on which the movable body can travel, from the present position of the movable body to the set new destination point, is searched by the return route searching process.

Thus, since the return route from the present position to the original departure point, which may be different from the reversion of the originally set route due to various factors such as the traffic regulations, the traffic jams etc., is searched, it is possible to speedily return to the original departure point.

In one aspect of the second route setting method, the destination point setting process includes an inputting process of inputting a command to set the return route, and sets the new destination point in case that the command is inputted by the inputting process.

According to this aspect, in case that the command to set the return route is inputted by the inputting process, the new destination point is set by the destination point setting process.

In another aspect of the second route setting method, the destination point setting process includes a detecting process of detecting whether or not the original departure point is stored in a memory device, and sets the new destination point in case that the original departure point is stored in the memory device according to a detection result of the detecting process.

According to this aspect, in case that the original departure point is stored in the memory device according to the detection result of the detecting process, the new destination point is set by the destination point setting process.

The above object of the present invention can be also achieved by a first route setting apparatus for use in a navigation system for navigating a movable body. The first route setting apparatus is provided with a process area setting device of setting a process area, which corresponds to a present position of the movable body, includes a plurality of route points and has a size based on a performance of a recovery route searching device, in case that the present position of the movable body does not exist on a set route from an original departure point to a final destination point. The set route includes the route points and is set in advance. The route setting apparatus is also provided with: a route point searching device of searching a closest route point, which is the closest to the final destination point among the route points on a boundary of or within the set process area; and the recovery route searching device of searching a recovery route from the present position of the movable body to the searched closest route point.

According to the first route setting apparatus of the present invention, in case that the present position of the movable body does not exist on the set route, the process area, which corresponds to the present position of the movable body, includes a plurality of route points and has a size based on the performance of the recovery route searching device, is set by the process area setting device. Then, a closest route point, which is the closest to the final destination point among the route points on a boundary of or within the set process area, is searched by the route point searching device. Then, a recovery route from the present position of the movable body to the searched closest route point is searched by the recovery route searching device. Accordingly, in case that the present position of the movable body is deviated from the set route, it is possible to recover or return to the set route via the closest route point.

Therefore, after the movable body has recovered or returned to the set route through the searched recovery route, it is possible to speedily reach the final destination point through the set route from the searched closest route point, so that the user can achieve his object more speedily.

In one aspect of the first route setting apparatus, the process area setting device sets the process area so that a process time required for the recovery route searching device is within a predetermined range of time.

According to this aspect, since, in the process area setting device, the process area is set so that the process time required for the recovery route searching process is within a predetermined range of time, by appropriately determining the predetermined range of time based on the performance of the recovery route searching process, it is possible to search the recovery route without causing an unnecessary time for searching the recovery route, so as to recover or return to the set route and reach the final destination point speedily in total.

In another aspect of the first route setting apparatus the process area setting device sets a circular area having a center thereof at the present position of the movable body, as the process area.

According to this aspect, the circular area which includes a plurality of route points and has a size based on the performance of the recovery route searching process, can be easily set by the process area setting device.

In another aspect of the first route setting apparatus, the process area setting device includes an inputting device of inputting a command to set the process area, and sets the process area in case that the command is inputted by the inputting device.

According to this aspect, in case that the command to set the process area is inputted by the inputting device, the process area is set by the process area setting device.

In another aspect of the first route setting apparatus, the process area setting device includes a detecting device of detecting whether or not the present position of the movable body exists on the set route, and sets the process area in case that the present position of the movable body does not exist on the set route according to a detection result of the detecting device.

According to this aspect, in case that the present position of the movable body does not exist on the set route according to the detection result of the detecting device, the process area is set by the process area setting device.

The above object of the present invention can be also achieved by a second route setting apparatus, for use in a navigation system for navigating a movable body, of setting a return route of the movable body, which exists on a set route from an original departure point to a final destination point set in advance, from a present position of the movable body to the original departure point. The second route setting apparatus is provided with: a destination point setting device of setting the original departure point as a new destination point; and a return route searching device of searching a return route, on which the movable body can travel, from the present position of the movable body to the set new destination point.

According to the second route setting apparatus of the present invention, the original departure point is set as a new destination point by the destination point setting device. Then, the return route, on which the movable body can travel, from the present position of the movable body to the set new destination point, is searched by the return route searching device.

Thus, since the return route from the present position to the original departure point is searched, it is possible to speedily return to the original departure point.

In one aspect of the second route setting apparatus, the destination point setting device includes an inputting device of inputting a command to set the return route, and sets the new destination point in case that the command is inputted by the inputting device.

According to this aspect, in case that the command to set the return route is inputted by the inputting device, the new destination point is set by the destination point setting device.

In another aspect of the second route setting apparatus, the destination point setting device includes a detecting device of detecting whether or not the original departure point is stored in a memory device, and sets the new destination point in case that the original departure point is stored in the memory device according to a detection result of the detecting device.

According to this aspect, in case that the original departure point is stored in the memory device according to the detection result of the detecting device, the new destination point is set by the destination point setting device.

The above object of the present invention can be also achieved by a first program storage device readable by a route setting apparatus for use in a navigation system for navigating a movable body, tangibly embodying a program of instructions executable by the route setting apparatus to perform method processes for setting a recovery route. The method processes are provided with: a process area setting process of setting a process area, which corresponds to a present position of the movable body, includes a plurality of route points and has a size based on a performance of a recovery route searching process, in case that the present position of the movable body does not exist on a set route from an original departure point to a final destination point, the set route including the route points and being set in advance; a route point searching process of searching a closest route point, which is the closest to the final destination point among the route points on a boundary of or within the set process area; and the recovery route searching process of searching a recovery route from the present position of the movable body to the searched closest route point.

According to the first program storage device, such as a CD-ROM, a ROM, a floppy disk or the like, of the present invention, the above described first route setting method of the present invention can be performed as the first route setting apparatus reads and executes the program of instructions.

The above object of the present invention can be also achieved by a second program storage device readable by a route setting apparatus for use in a navigation system for navigating a movable body, tangibly embodying a program of instructions executable by the route setting apparatus to perform method processes for setting a return route of the movable body, which exists on a set route from an original departure point to a final destination point set in advance, from a present position of the movable body to the original departure point. The method processes are provided with: a destination point setting process of setting the original departure point as a new destination point; and a return route searching process of searching a return route, on which the movable body can travel, from the present position of the movable body to the set new destination point.

According to the second program storage device, such as a CD-ROM, a ROM, a floppy disk or the like, of the present invention, the above described second route setting method of the present invention can be performed as the second route setting apparatus reads and executes the program of instructions.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained. In the embodiment explained below, the explanation is made as for a case where the present invention is applied to an on-vehicle navigation apparatus for a vehicle or auto-mobile.

(I) CONSTRUCTION OF APPARATUS

At first, a whole construction of the on-vehicle navigation apparatus as the embodiment of the present invention is explained with reference to FIG. 1.

Figure 1:
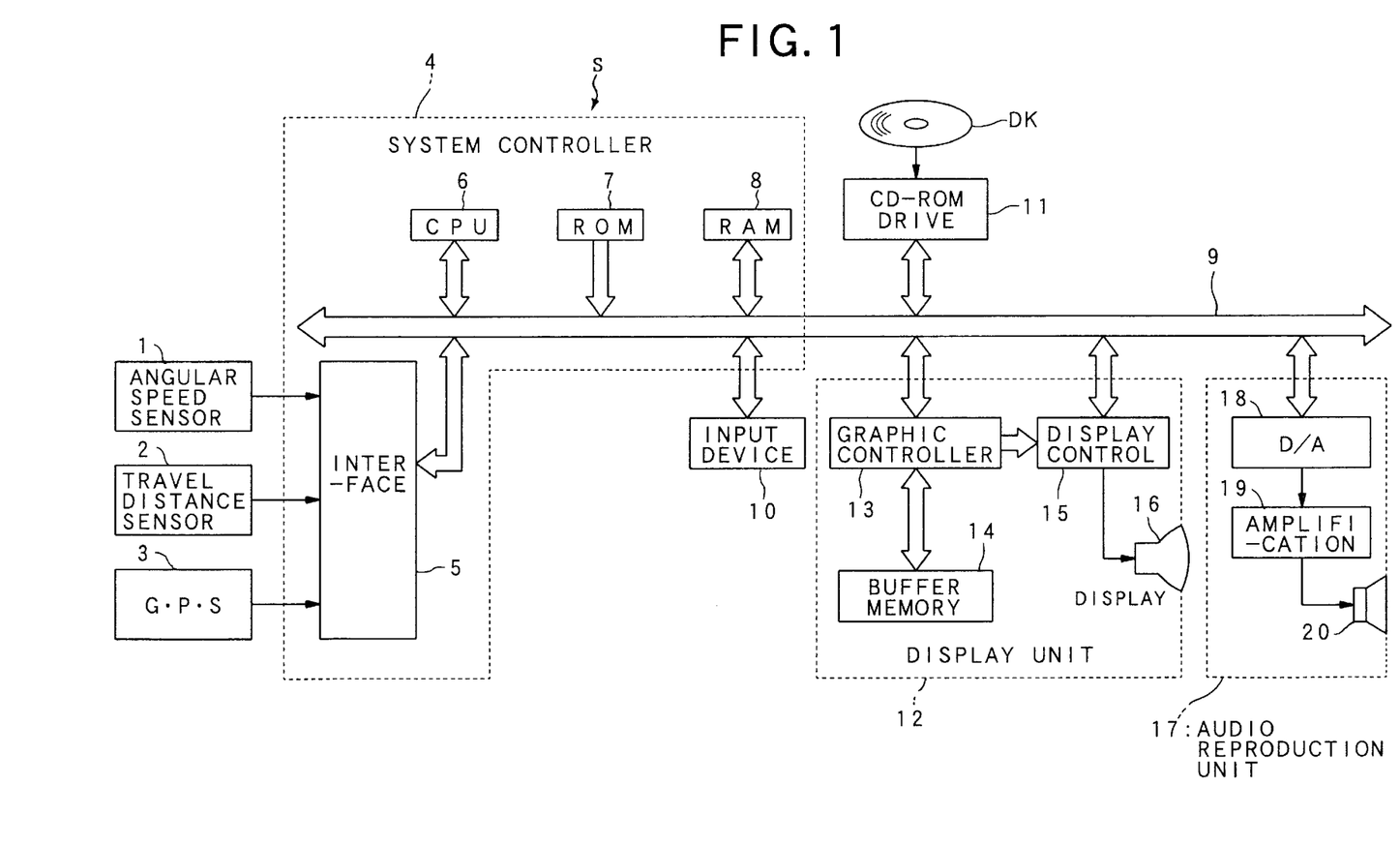
FIG. 1 is a block diagram of a navigation apparatus for use in embodiments of the present invention.

In FIG. 1, an on-vehicle navigation apparatus S is provided with: an angular speed sensor 1 for detecting an angular speed of a self vehicle at a time of turning or rotating, and outputting an angular speed data and a relative azimuth data; a travel distance sensor 2 for calculating the number of pulses per one rotation of a drive shaft by counting the number of pulses of a pulse signal having a predetermined cycle accompanying the rotation of the drive shaft, and for outputting travel distance data based on the number of pulses per one rotation of the drive shaft; a GPS receiver 3 for receiving electric waves from GPS satellites to output GPS measurement data, and for outputting absolute azimuth data of the advance direction of the self vehicle; a system controller 4 for performing an overall control of the navigation apparatus S on the basis of the relative azimuth data, the angular speed data, the travel distance data, the GPS measurement data and the absolute azimuth data; an input device 10 for inputting various data, such as an operation panel, a remote-control device or the like; a CD-ROM (Compact Disk-Read Only Memory) drive 11 for reading and outputting various data, such as map data including road data, which indicates the number of lanes, the width of the road etc., and control programs corresponding to respective embodiments described later from a CD-ROM disk DK, under the control of the system controller 4; a display unit 12 for displaying various display data under the control of the system controller 4; and an audio reproduction unit 17 for reproducing and outputting various audio data under the control of the system controller 4.

The system controller 4 is provided with: an interface portion 5 for executing an interface operation with external sensors e.g. the angular speed sensor 1, the travel distance sensor 2 and the GPS receiver 3; a CPU 6 for controlling the whole portion of the system controller 4; a ROM (Read Only Memory) 7 for storing a control program etc. to control the system controller 4; and a RAM (Random Access Memory) 8 having a non-volatile type memory for storing various data such as the route data set in advance by the user through the input device 10, in the random accessing manner. The input device 10, the CD-ROM drive 11, the display unit 12 and the audio reproduction unit reference 17 are all connected with the system controller 4 via a bus line 9.

The display unit 12 is provided with: a graphic controller 13 for performing an overall control of the display unit 12 on the basis of a control data transmitted from the CPU 6 through the bus line 9; a buffer memory 14 having a VRAM (Video RAM) etc., for temporarily storing the image information ready to be displayed; and a display control unit 15 for controlling a display 16 such as the LCD device, the CRT display device or the like, on the basis of the image data outputted from the graphic controller 13.

The audio reproduction unit 17 is provided with a D/A (Digital to Analog) converter 18 for performing a D/A conversion of audio digital data transmitted from the CD-ROM drive 11 or the RAM 8 through the bus line 9; an amplifier 19 for amplifying an audio analog signal from the D/A converter 18; and a speaker 20 for converting the amplified audio analog signal to the audio sound, and for outputting it to the external.

Nextly, the operation of the on-vehicle navigation apparatus S of the present embodiment is explained with reference to a flow chart of FIG. 2.

The operation indicated by the flow chart in the embodiment hereinbelow is mainly performed by the CPU 6, and is performed as one part of the main navigation program to perform the navigation operation by controlling the whole portion of the on-vehicle navigation apparatus S. Therefore, during the execution of the main navigation program, the operation indicated by the flow chart of each embodiment is executed as the occasion demands.

The program corresponding to the flow chart of each embodiment described below is stored in the CD-ROM disk DK as the control program in advance, and is read out therefrom through the CD-ROM drive 11 as the occasion demands.

In the present embodiment, the CD-ROM disk DK as one example of a program storage device, tangibly embodies a program of instructions executable by the system controller 4 to perform method processes for setting a recovery or return route as explained in detail with reference to the flow charts of FIGS. 2, 4 and 7 to 9. The program read by She CD-ROM drive 11 may be stored in the RAM 8, so as to speedily execute the program. Alternatively, the program may be stored in a ROM 7 in advance, or may be received through a wire or wireless communication line by use of a modem and stored into the RAM 8.

(II) First Embodiment

A first embodiment is constructed as following. Namely, in case that a present position of a self vehicle is deviated from a set route to a final destination point which is set in advance, a set circle C having a predetermined radius is set such that the present position of the self vehicle is positioned at the center thereof. Among route points located within the set circle C, one route point which is the closest to the final destination point is searched as a route point to be traveled through when the self vehicle returns or recovers to the set route. Then, the recovery route is searched between the searched route point and the present position to return or recover to the set route.

At first, the whole process of a recovery route setting process in the first embodiment is explained with reference to a flow chart of FIG. 2 and a diagram of FIG. 3.

Figure 2:
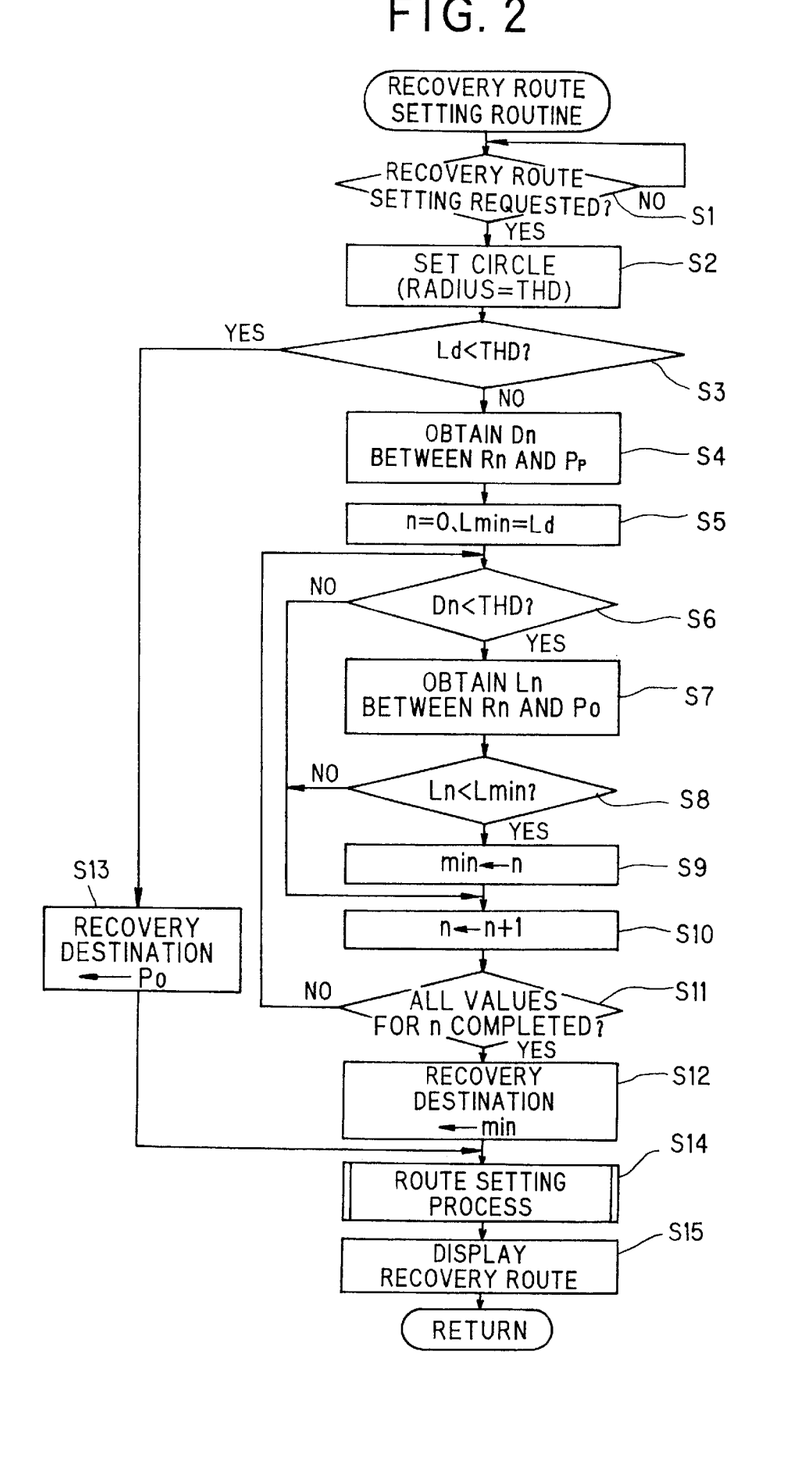
FIG. 2 is a flow chart showing a process in a first embodiment.

As shown in FIG. 2, in the recovery route setting process of the first embodiment, it is firstly judged whether or not there is a command input to set the recovery route through the input device 10 (step S1). If there is no command input (step S1: NO), the navigation apparatus S waits for the command input as it is. If there is the command input (step S1: YES), a set circle C having a radius as: r=THD is set as a process area such that a present position Pp of the self vehicle is positioned at a center of the circle C (step S2). At this time, the value of the radius THD of the set circle C is determined in advance to be such a value that a time duration required for actually executing the route setting process is within a predetermined time range, on the basis of the data amount read out and stored at once from the CD-ROM disk DK in the route setting process, the area on the map which can be covered by the route setting process (i.e. the searching process) by just once, the road arrangement condition (e.g. the road density) within the set circle C and so on, so that the route setting process at a step S14 described later may not harmfully influence the other navigation processes.

When the set circle C is set (step S2), it is judged whether or not a distance Ld from the present position Pp of the self vehicle to the final destination point Po is smaller than the radius THD which is the radius of the pertinent set circle C (step S3).

If the distance Ld is smaller than the radius THD by the judgment at the step S3 (step S3: YES), since the final destination point Po is within the set circle C, the final destination point Po is set as the recovery destination point (step S13), and the route setting process from the present position Pp to the recovery destination point is executed (step S14).

On the other hand, if the distance Ld is not smaller than the radius THD by the judgment at the step S3 (step S3: NO), since the final destination point Po is not within the set circle C, a distance Dn between the present position Pp and each of route points Rn (n=0, 1, 2, . . . ) is obtained as for all of the route points Rn on the set route (step S4). Then, as initial setting, a parameter n, which indicates the serial number of these route point Rn on the set route, is set to "0" (i.e., n=0), and that a parameter Lmin, which indicates the shortest distance among the distances respectively between the final destination point Po and each of the route points Rn, is set to "Ld" (i e. , Lmin=Ld), which is set as the distance from the present position Pp to the final destination point Po (step S5).

Then, it is judged whether or not a distance $D_0$ corresponding to the first route point $R_0$ is smaller than the radius THD of the set circle C i.e., the route point $R_0$ is located within the set circle C (step S6). In the present case of FIG. 3, the route point $R_0$ is not located within the set circle C (step S6: NO), the flow is branched to a step S10, where the parameter n is incremented by just one (step S10), and the flow is proceeded to a step S11. Then, by the judgment at the step S11, it is judged whether or not the processes are completed as for all values of the parameter n (step S11). Since the parameter n is "1" at the present time, the judgment result as the step S11 is "NO", so that the flow returns to the step S6.

Nextly, at th e step S6, it is judged whether or not the route $R_1$ is located within the set circle C. In the present case of FIG. 3, since the route point $R_1$ is located within the set circle C (step S6: YES), a distance $L_1$ between the route point $R_1$ and the final destination point Po is calculated (step S7). Then, this calculated distance $L_1$ and the distance Lmin are compared with each other (step S8). By the judgment at the step S8, in the present case, since the current value Lmin is "Ld", Lmin (=Ld)<$L_1$.

Thus, the judgment result at the step S8 is "NO", so that the parameter n is incremented by one at the step S10. Then, the flow returns to the step S6 through the step S11. Nextly, the processes from the step S6 to the step S8 are performed with respect to the route point $R_2$ corresponding to "n=2". At the step S8, again this time, Ld<$L_2$ ($L_2$ is the distance between the route point $R_2$ and the final destination point Po).

Thus, the judgment result at the step S8 is "NO", so that the flow returns to the step S6 through the steps S10 and S11. Nextly, the processes from the step S6 to the step S8 are performed with respect to the route point $R_3$ corresponding to "n=3". At this time, Ld>$L_3$ ($L_3$ is the distance between the route point $R_3$ and the final destination point Po).

Thus, the judgment result at the step S8 is "YES", so that the Lmin is updated by the distance "$L_3$" at the step S9. Then, the flow returns to the step S6 through the steps S10 and S11. Then, the processes from the step S6 to the step S8 are performed with respect to the route point $R_4$ corresponding to "n=4". At this time, Lmin (=$L_3$)>$L_4$ ($L_4$ is the distance between the route point $R_4$ and the final destination point Po)

Thus, the judgment result at the step S8 is "YES", so that the Lmin is updated by the "$L_4$" at the step S9.

Figure 3:
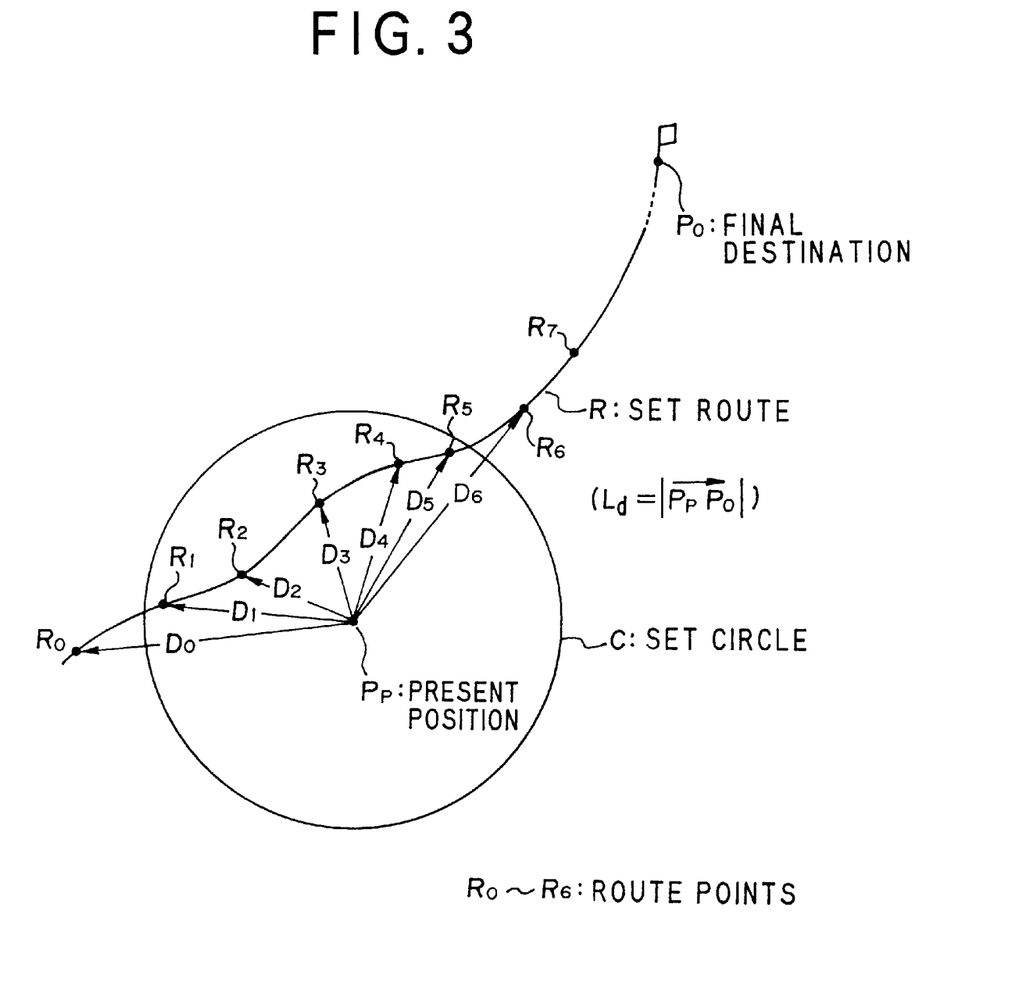
FIG. 3 is a diagram showing a route setting process for setting a recovery route in the first embodiment.

When the above explained processes are performed with respect to all values of the parameter n, the parameter Lmin is resultantly the distance $L_5$ between the route point $R_5$ corresponding to "n=5" and the final destination point Po, in the present case of FIG. 3.

Then, since the steps S6 to S10 have been performed with respect to all values of the parameter n, the judgment result at the step S11 is "YES" at this time, so that the route $R_5$ corresponding to the distance $L_5$ is set as a route point on the set route R to return or recover onto the set route (i.e. a recovery destination point) (step S12). Then, the setting process for setting the recovery route from the present position Po to the route point $R_5$ as the recovery destination point is performed (step S14). The concrete process in the step S14 will he described later in detail.

After that, when the recovery route from the present position Pp to the recovery destination point (i.e. the route point $R_5$) is set (step S14), the set recovery route is displayed on the display 16, and that the flow returns to the main navigation program.

Figure 4:
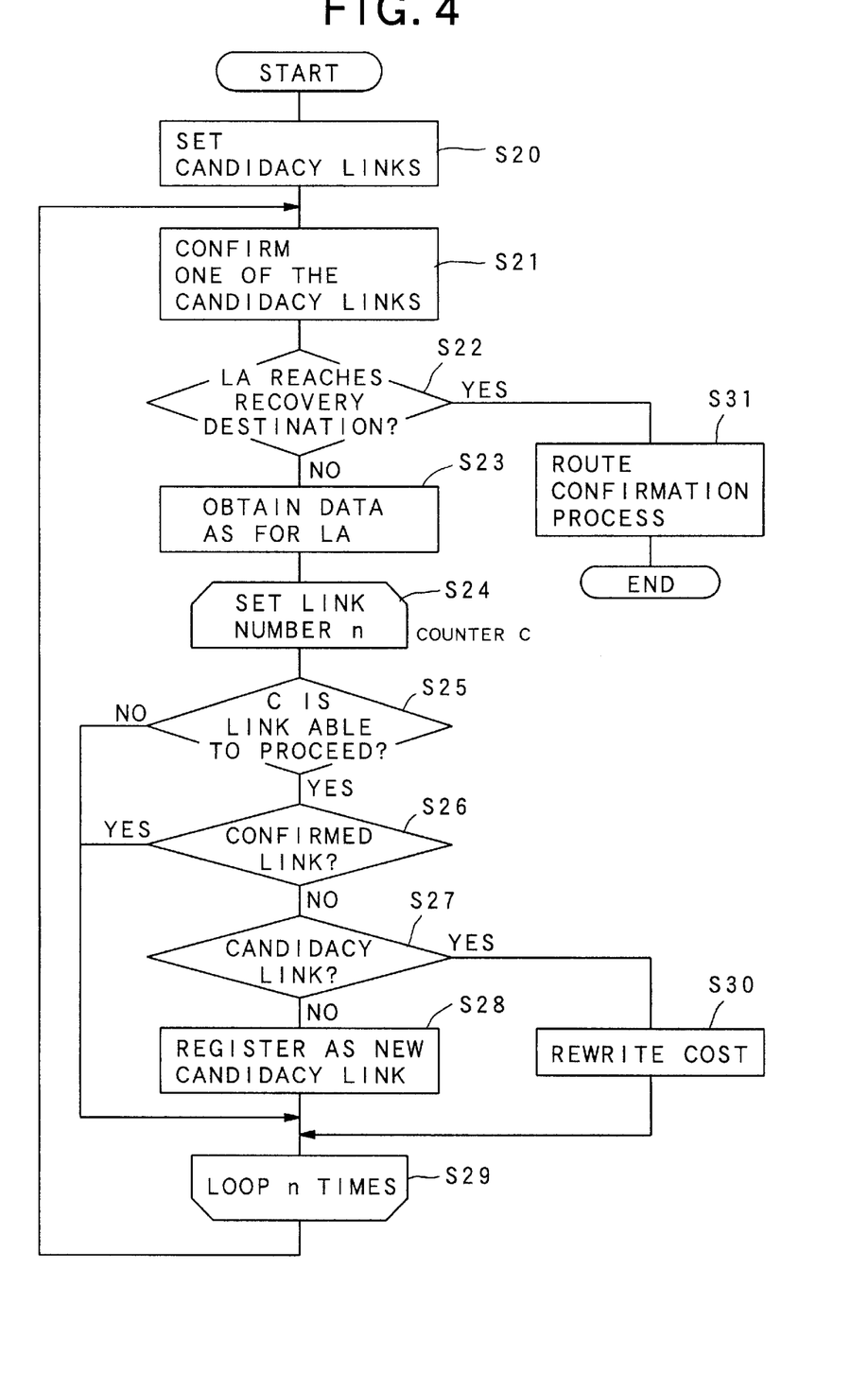
FIG. 4 is a flow chart showing a route setting process in the first embodiment.

Nextly, the route setting process at the step S14 in FIG. 2 is explained in more detail with reference to FIGS. 4 to 7. Incidentally, the route setting process shown in FIG. 4 is a route setting process by means of the Dijkstra method which is the known general method for solving the shortest route subject. In the flow chart of FIG. 4, the "link" represents a vector from a certain route point to its adjacent route point. Further, the "cost" represents the length of the link (i.e. the length of the vector).

As shown in FIG. 4, in the route setting process of the present embodiment, at first, all links which are connected to the present position Pp are set as the candidacy links (step S20).

Successively, the system controller 5 determines or confirms one link (hereinbelow, it is referred to as a link LA), which cost (i.e. integrated cost which corresponds to the integrated distance from the present position) is the minimum, out of all candidacy links (step S21).

Nextly, it is judged whether or not this link LA as a first link reaches the recovery destination point (step S22). If it reaches the recovery destination point (step S22: YES), the route confirmation process described later in detail is performed (step S31), and the flow returns to the main navigation program.

On the other hand, in the judgment in the step S22, if the link LA does not reach the recovery destination point (step S22: NO), the data with respect to the connection condition including the link judgment data as for the link LA are obtained (step S23).

From the data as for the link LA, the total number n of the links connected to the link LA is set to the counter C provided in the CPU 6 (step S24).

Successively, it is judged whether or not the self vehicle is able to proceed to a road corresponding to the link which is expressed by the counter C on the basis of the link judgment data i.e., whether or not the link expressed by the counter C can be adopted as the candidacy link under the traffic regulation thereof (step S25).

By the judgment at the step S25, if the link expressed by the counter C cannot be adopted as the candidacy link (NO), the counter C is counted-down, so that the processes at and after the step S25 are performed again (step S29).

By the judgment at the step S25, if the link expressed by the counter C can be adopted as the candidacy link (step S25: YES), it is judged whether or not the link expressed by the counter C is the confirmed link (step S26).

By the judgment at the step S26, if the link expressed by the counter C is the confirmed link (step S26: YES), the counter C is counted-down, so that the processes at and after the step S25 are performed again (step S29).

By the judgment at the step S26, if the link expressed by the counter C is not the confirmed link (step S26: NO), it is judged whether or not the pertinent link is the candidacy link (step S27).

By the judgment at the step S27, if the link expressed by the counter C is not the candidacy link (step S27: NO), the link expressed by the counter C is adopted and registered as the new candidacy link (step S28), and the counter C is counted-down, so that the processes at and after the step S25 are performed again (step S29).

By the judgment at the step S27, if the link expressed by the counter C is the candidacy link (step S27: YES), and in case that the integrated cost becomes smaller if the link LA is passed through (i.e., if the link LA is adopted), the link LA is adopted as the confirmed link (index), and the integrated cost via the link LA is rewritten as the integrated cost (step S30).

After that, the processes from the step S25 to the step 29 are performed by n times on the basis of the counter C (step S29), and it returns to the process at the step S21, so that the process is performed until the new link LA reaches the recovery destination point.

By constructing in the above described manner in which the route are selected, judged and confirmed by the unit of link i.e. not by the unit of node as in the aforementioned Dijkstra method of the related art, even if the traffic regulations are considered, the shortest route can be certainly obtained which reaches the recovery destination point $R_5$ from the present position Pp.

Figure 5:
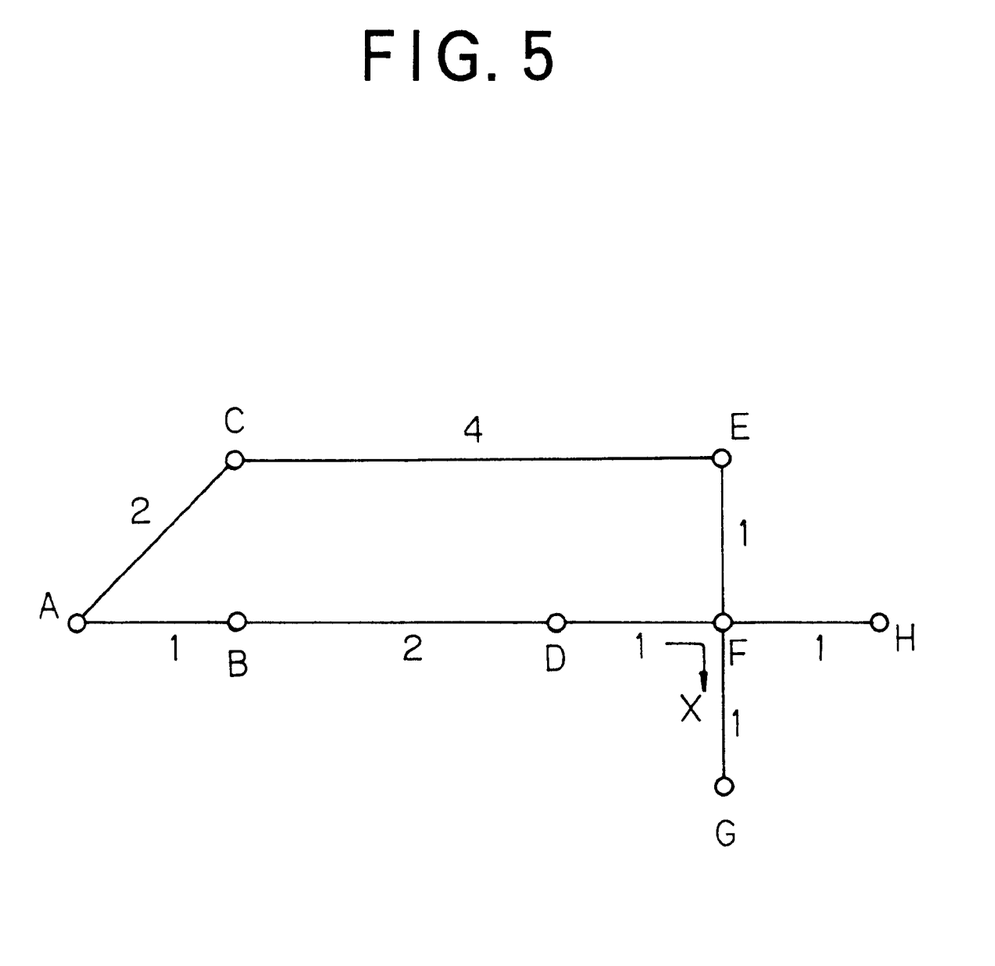
FIG. 5 is a route diagram showing a concrete example (I) of the route setting process in the first embodiment.
Figure 6:
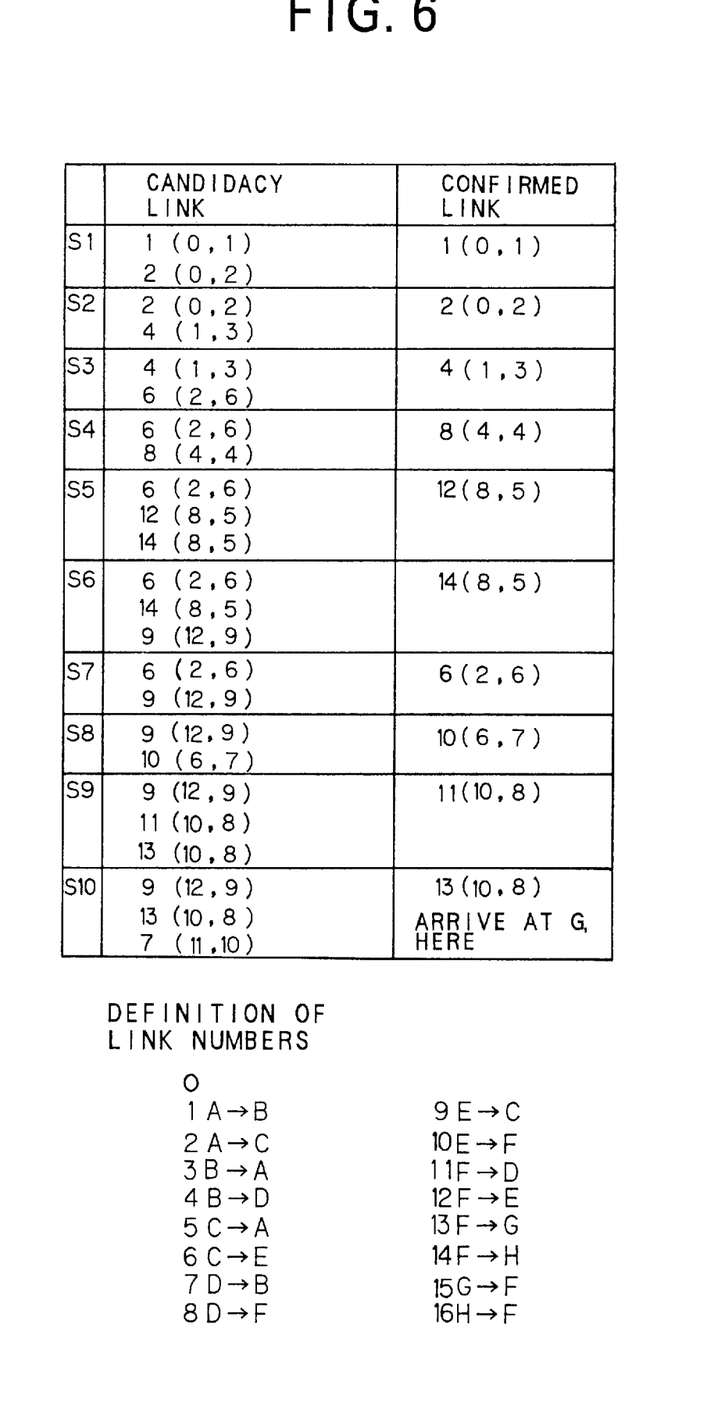
FIG. 6 is a table diagram showing a concrete example (II) of the route setting process in the first embodiment.

Nextly, the route setting process at the step S14 is more concretely explained with referring to FIG. 5 and FIG. 6. In the explanations hereinbelow, a route point is referred to as a "node" in general, and a step number is given to it each time when respective one confirmed link is determined.

In FIG. 5, it is assumed that the starting position (i.e. the present position Pp in FIG. 3) is a node A, the destination (i.e. the recovery destination point $R_5$ in FIG. 3) is a node G, a route of a node D→a node F→a node G cannot be adopted since the right turn is prohibited thereon, and that the U turn is also prohibited. Each numeral represents a link length or a distance between nodes.

In FIG. 6, the expression X (Y, Z) expresses a link number X of a candidacy link (including a directional property), a link number Y of a link which has been already confirmed one step before the candidacy link of the link number X, and an integrated cost Z (integrated distance) from the starting position to the end of the candidacy link of the link number X through the link of the link number Y. The definitions of the link numbers 1 to 16 are shown in the lower portion of FIG. 6. more concretely, the expression 4 (1, 3) in the candidacy link column of the table of FIG. 4 for example, expresses that: the link from the node B to the node D (which link number="4") is adopted as the candidacy link; the link before this adopted candidacy link is the link from the node A to the node B (which link number="1"), and that the integrated cost from the starting position to the node D through these links (which link numbers=1 and 4) is "3".

In the below explanation, a link from the node A to the node B is expressed as a "link A→B", and a link from the node B to the node A is expressed as a "link B→A" conversely. Other links are also expressed in the same manner.

Firstly, the node A which is the starting position is set as the confirmed node. The obtained candidacy links are the link A→B having the link number=1 (corresponding to 1(0, 1)) and the link A→C having the link number=2 (corresponding to 2(0, 2)). Among these candidacy links, the link which has the minimum cost is the link A→B (cost=1). Thus, the link A→B is set as the confirmed link (step S1 in FIG. 6).

As a result, the link B→D having the link number=4 which is connected to the node B is newly adopted as the candidacy link (corresponding to 4(1, 3)). Thus, the link A→C and the link B→D become the candidacy links. The link which has the minimum cost among these candidacy links is the link A→C (cost=2), so that the link A→C is set as the confirmed link (step S2 in FIG. 6). In this case, the link B→A (link number=3) is not adopted as the candidacy link since it is the U turn.

Successively, the link C→E having the link number=6 which is connected to the node C is newly adopted as the candidacy link (corresponding to 6(2, 6)). The link B→D and the link C→E become the candidacy links. The link which has the minimum cost among these candidacy links is the link B→D (cost=3), so that the link B→D is set as the confirmed link (step S3 in FIG. 6).

Further, the link D→F having the link number=8 which is connected to the node D is newly adopted as the candidacy link (corresponding to 8(4, 4)). Thus, the link C→E and the link D→F become the candidacy links. The link which has the minimum cost among these candidacy links is the link D→F (cost=4), so that the link D→F is set as the confirmed link (step S4 in FIG. 6).

Nextly, the link F→E having the link number=12 and the link F→H having she link number=14 which are connected to the node F are newly adopted as the candidacy links (corresponding to 12(8, 5) and 14(8, 5) respectively). Thus, the links C→E, the link F→E and the link F→H become the candidacy links. In this case, the link F→D having the link number=11 which is connected to the node F is not adopted since it is the U turn, and the link F→G having the link number=13 is not adopted since it comes under the traffic regulation of the right turn prohibition on the basis of the link judgment data.

Although each of the link F→E (cost=5) and the link F→H (cost=5) is the link which has the minimum cost among these candidacy links, the link F→E is set as the confirmed link, since the link which link number is the minimum is ruled to be set as the confirmed link in case that a plurality of candidacy links are adopted as the link having the minimum cost (step S5 in FIG. 6).

Successively, the link E→C having the link number=9 which is connected to the node E is newly adopted as the candidacy link (corresponding to 9(12, 9)). Thus, the link C→E, the link F→H and the link E→C become the candidacy links. The link which has the minimum cost among these candidacy links is the link F→H (cost=5), so that the link F→H is set as the confirmed link (step S6 in FIG. 6).

Here, since there is no link connected to the node H, the link which has the minimum cost among the remained candidacy links is the link C→E (cost=6), so that the link C→E is set as the confirmed link (step S7 in FIG. 6).

Nextly, the link E→F having the link number=10 which is connected to the node E is newly adopted as the candidacy link (corresponding to 10(6, 7)). Thus, the link E→C and the link E→F become the candidacy links. The link which has the minimum cost among these candidacy links is the link E→F (cost=7), so that the link E→F is set as the confirmed link (step S8 in FIG. 6).

Further, the link F→D having the link number=11 and the link F→G having the link number=13 which are connected to the node F are newly adopted as the candidacy link (corresponding to 11(10, 8) and 13(10, 8) respectively). Thus, the link E→C, the link F→D and the link F→G become the candidacy links. Although each of the link F→D (cost=8) and the link F→G (cost=8) is the link which has the minimum cost among these candidacy links, the link F→D is set as the confirmed link, since the link which link number is the minimum is ruled in the present embodiment to be set as the confirmed link in case that a plurality of candidacy links are adopted as the link having the minimum cost (step S9 in FIG. 6). Here, the link, which link number is the maximum in place of the minimum, may be ruled to be set as the confirmed link depending on the manner of assigning the link numbers to the links.

On the other hand, in case that a plurality of links are adopted as the candidacy links each having the minimum cost and that there is one link which has been already adopted as the candidacy link in the process steps until the previous step, the link which has been adopted as the candidacy link in the earliest process step is set as the confirmed link.

In addition, it is possible to construct the apparatus such that the processes are ended by judging whether or not the link F→G reaches the node G which is the destination in this case. In this case, since the link F→E (link number=12) has been already confirmed at the step S5 and the link F→H (link number=14) has been also already confirmed at the step S6, they are not adopted.

Successively, the link D→B having the link number=7 which is connected to the node D is newly adopted as the candidacy link (corresponding to 7(11, 10)). Thus, the link E→C, the link F→G and the link D→B become the candidacy links. The link which has the minimum cost among these candidacy links is the link F→G (cost=8), so that the link F→G is determined as the confirmed link (step S10 in FIG. 6).

Then, since the link F→G is the link connected to the destination node G, by use of each of the confirmed links confirmed in the steps S1 to S10 in FIG. 6 and as explained above, the route is determined and set from the departure node A (i.e. the present position Pp) to the destination node G (i.e. the recovery destination point $R_s$). This process corresponds to the route confirmation process (step S31) in FIG. 4. The route confirmation process is explained with reference to FIG. 7.

Figure 7:
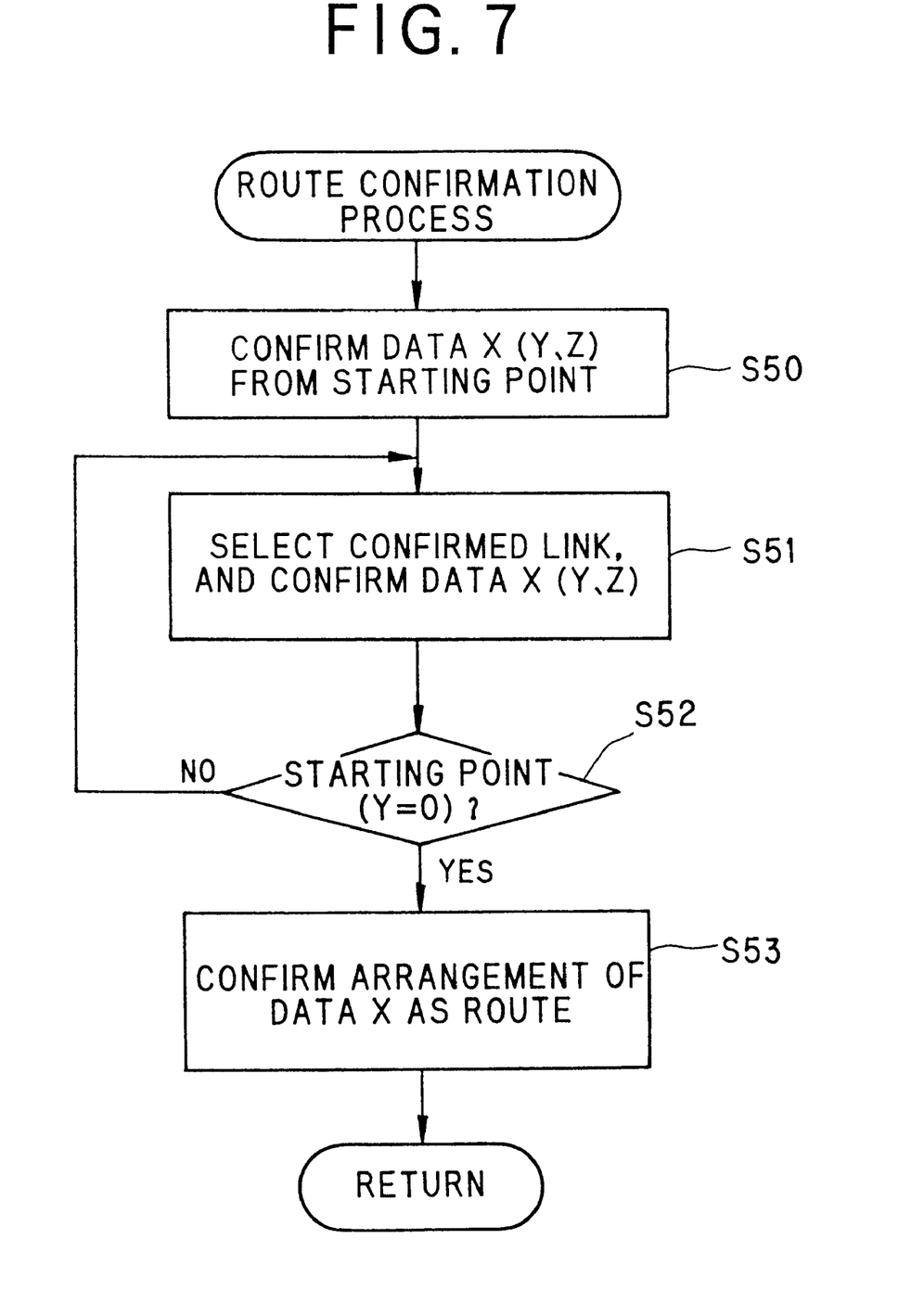
FIG. 7 is a flow chart showing a route confirmation process.

As shown in FIG. 7, in the route confirmation process by use of a confirmed link which has been confirmed, at first, when a link reaching the destination point (i.e. the starting point) is confirmed as a confirmed link (step S50), another confirmed link, which link number (Y) indicating a previous confirmed link one link previous to the above mentioned confirmed link reaching the destination point coincides with the confirmed link number (X), is selected among the confirmed links which have been confirmed at each of the steps shown in FIG. 6 (step S51). After that, it is judged whether or not the confirmed link selected at the step S51 is the confirmed link reaching the original departure point (i.e., the confirmed link which link number Y indicating one previous confirmed link is "0") (step S52). If it is not the confirmed link reaching the departure point (step S52: NO), the flow returns to the step S51 so as to select another confirmed link which is one link previous to the confirmed link selected at the step S51. Namely, by repeating the steps S51 and S52, the confirmed links are selected in the order retrograding from the confirmed link reaching the destination point toward the confirmed link reaching the departure point.

Then, by the judgment at the step S52, if it is the confirmed link reaching the departure point (step S52: YES), finally, the route from the departure point to the destination point is confirmed by the link numbers at each of the confirmed links (step S53).

The above explained steps S50 to S53 are more concretely explained with reference to the example shown in FIG. 6. At first, the link F→G i.e. the link (13(10, 8) in which the present link number X=13, the previous link number Y=10 and the accumulated cost Z=8), is confirmed as the confirmed link reaching the destination point (step S50). Nextly, the confirmed link, which has the link number Y (=10) of the link F→G (13(10, 8)) as the link number X, is selected, so that the link E→F (10(6, 7)) is obtained (step S51). Then, since the value of the link number Y is not "0" at the link E→F (10(6, 7)) (step S52: NO), the confirmed link C→E (6(2, 6)), which has the link number Y (=6) of the link E→F (10(6, 7)) as the link number X, is selected (step S51). Then, the confirmed link, which has the link number Y (=2) of the link C→E (6(2, 6)) as the link number X is selected, so that the link A→C (2(0, 2)) is obtained. At this time, since the value of the link number Y is "0" (step S52: YES), the route from the departure point node A to the destination point node G is confirmed by the arrangement of the link numbers obtained until the present (2→6→10→13) (step S53).

After the shortest route to reach the node G which is the destination point is confirmed by the processes described above, the operation flow returns to the main navigation program.

As a result, the combination of the links from the departure point node A to the destination point node G is: the link A→C (link No. 2), the link C→E (link No. 6), the link E→F (link No. 10) and the link F→G (link No. 13), which accumulated cost is "8".

As explained above, according to the recovery route setting process of the first embodiment, in case that the self vehicle is deviated from the set route R, since the recovery route is newly searched from the present position Pp of the self vehicle to the recovery destination point $R_5$, it is possible to return to the set route R via the route point which is closer than the final destination point Po.

In the process of setting the set circle C, since the set circle C is set such that the process time duration for executing the route setting process can be within a predetermined time range which is set in advance, it is possible to speedily return to the set route R by reducing the time duration required for searching the recovery route to the recovery destination point $R_5$ from the present position Pp.

In the above explanation for the first embodiment, although the case has been explained where the set circle C having its center at the present position Pp of the self vehicle is set as the process area, it is not limited to this. Instead, it is possible to set a rectangular area, for example, having its center at the present position Pp as the process area.

In the above mentioned first embodiment, although it is judged whether or not there is the command input to set the recovery route at the step S1 and the processes after that are performed according to the judgment result, it is not limited to this. In stead, the deviation of he self vehicle from the set route R may be automatically detected by use of the GPS measurement data etc., and the processes at and after the step S3 may be performed automatically if the deviation from the set route R is detected.

(III) Second Embodiment

Nextly, a second embodiment will be explained with reference to FIGS. 8 and 9.

In the second embodiment, the recovery route is searched such that the original departure point is treated as a new destination point independently from the route on which the self vehicle has been traveling to the present position Pp, in case that the self vehicle is to return from the present position Pp of the self vehicle existing on the set route R to the original destination point.

Figure 8:
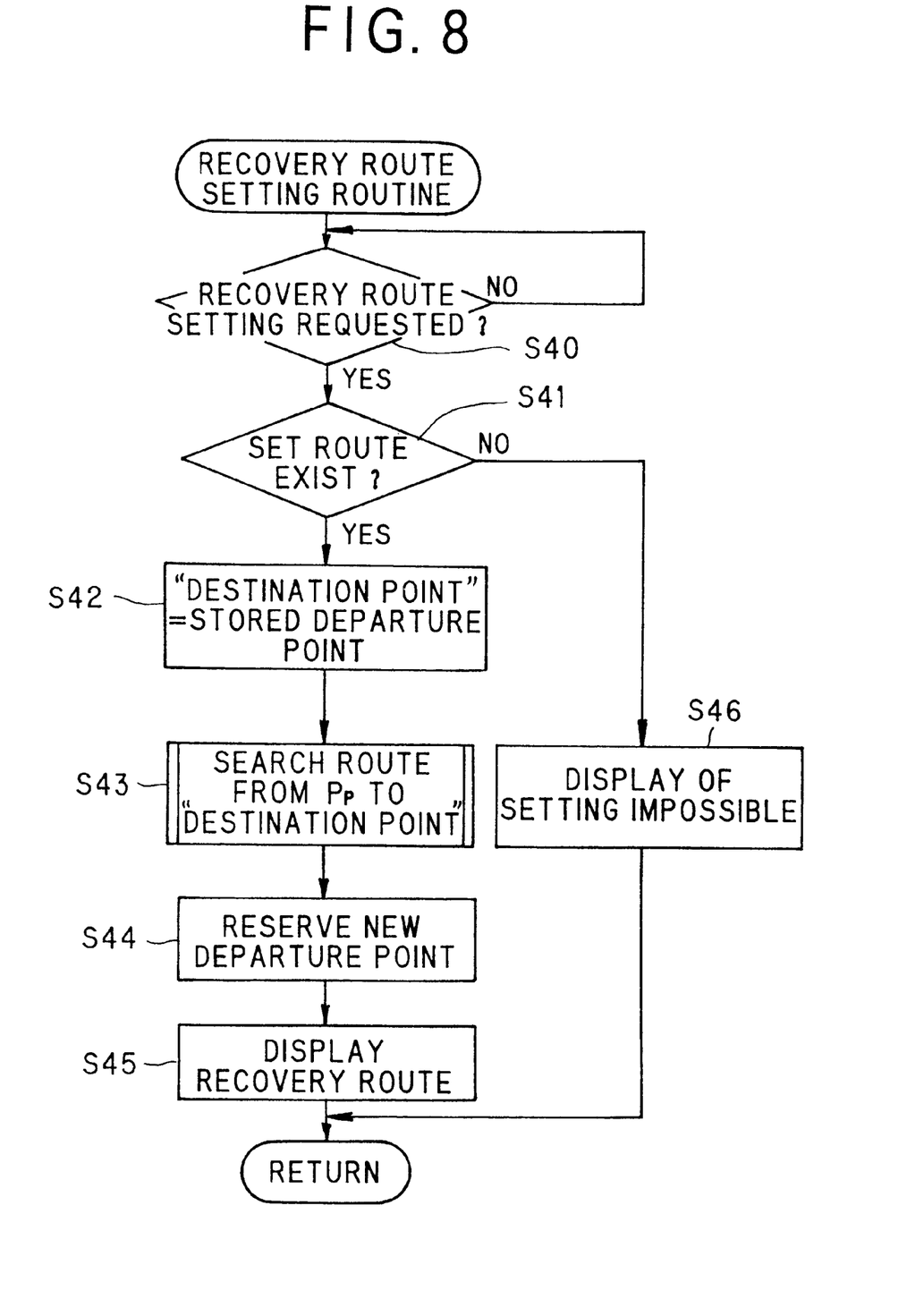
FIG. 8 is a flow chart (I) showing a process in a second embodiment.
Figure 9:
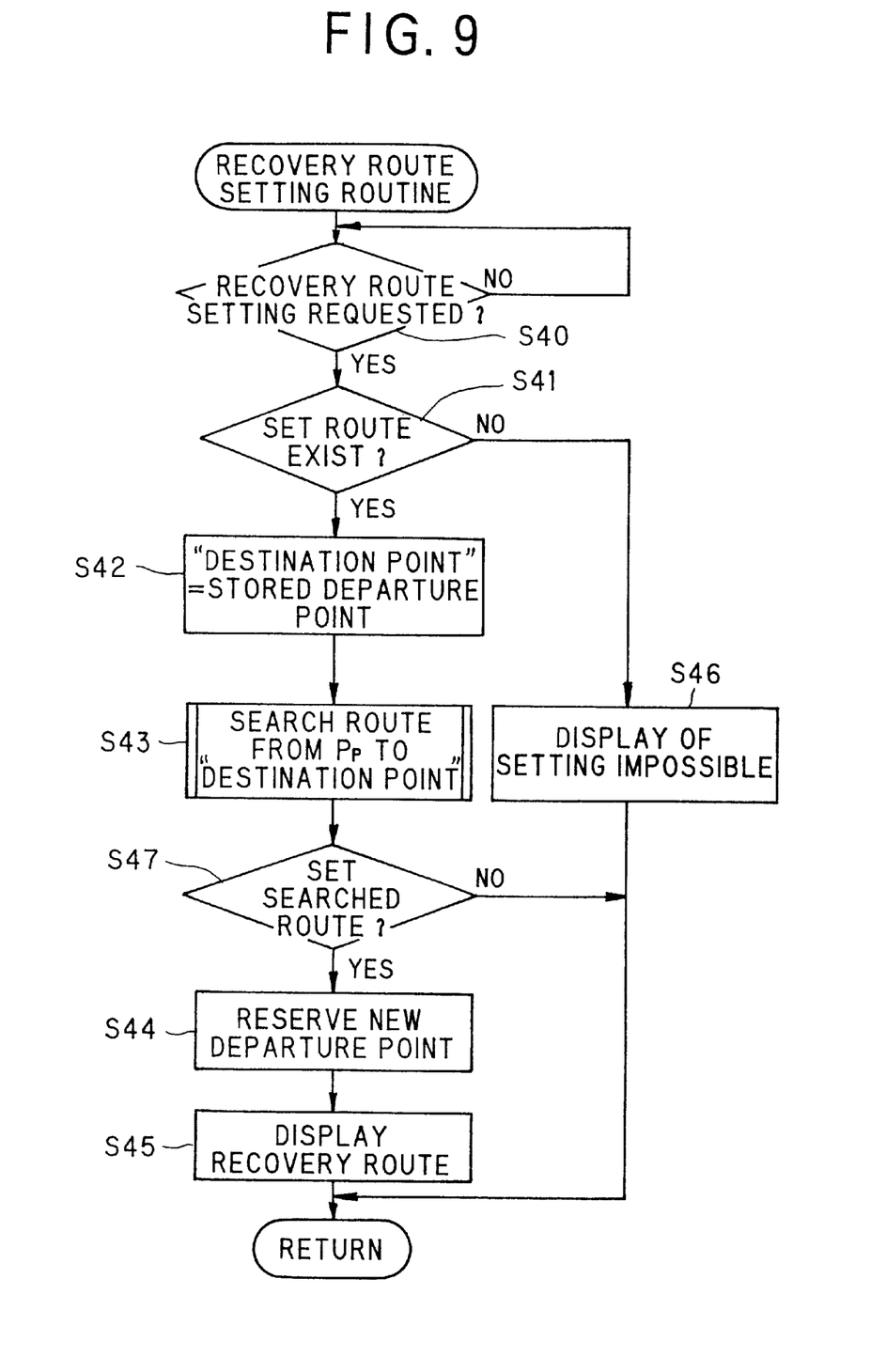
FIG. 9 is a flow chart (II) showing a process in the second embodiment.

In the recovery route setting process in the second embodiment, as shown in a flow chart of FIG. 8, at first it is judged whether or not there is a command input to set the recovery route at the input device 10 (step S40). If there is no command input (step S40: NO), the command input is waited for as it is. On the other hand, if there is the command input (step S40: YES), it is judged whether or not the set route, on which the self vehicle has been traveling until the present time, exists and that the original departure point is stored (step S41). Then, if the set route does not exist or the original departure point is not stored (step S41: NO), since the original departure point cannot be confirmed and the recovery route cannot be set on the basis of it, a message of "route setting impossible" is displayed (step S46). Then, the operation flow returns to the main navigation program.

On the other hand, if the set route exists and the original departure point is stored (step S41: YES), the original departure point (i.e. the stored departure point) is set as the destination point (step S42), so that the process of setting the recovery route to the pertinent destination point is performed (step S43). The recovery route setting process at the step S43 is performed in the same manner as the process in the step S14 in FIG. 2 such that the original departure point is treated as the destination point and that the present position Pp of the self vehicle is treated as the starting point or the new departure point (FIGS. 4 to 7). Then, the new departure point (i.e. the present position Pp of the self vehicle) is stored or reserved for the next process (step S44), and the newly set recovery route is displayed (step S45). Then, the operation flow returns to the main navigation program.

As described above in detail, according to the recovery route setting process of the second embodiment, since the recovery route, on which the self vehicle can actually travel in consideration with the traffic regulations etc. from the present position to the original departure point is searched, it is possible to return to the original departure point speedily.

Incidentally, in the process of the second embodiment, as shown in FIG. 8, after executing the processes at the steps S41 to S43, it may be detected whether or not the setting of the recovery route searched at the step S43 is requested by the user (step S47), and the processes at the steps S44 and 45 are executed only if it is detected that the setting is requested e.g., if there is a command input to set the recovery route at the input device 10 (step S47: YES). By this, it is possible to set the recovery route which reflects the user's intention.

Further, the navigation apparatus of the present embodiment can be adapted as the navigation apparatus for the airplane or the ship as well as the vehicle or auto-mobile.

The invention may be embodied in other specific forms without departing from the spirit or essential characteristics thereof. The present embodments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A route setting method for use in a navigation system for navigating a movable body, said route setting method comprising:

a process area setting process of setting a process area, which corresponds to a present position of said movable body, includes a plurality of route points and has a size based on a performance of a recovery route searching process, in case that the present position of said movable body does not exist on a set route from an original departure point to a final destination point, said set route including said route points and being set in advance; and a route point searching process of searching a closest route point, which is the closest to said final destination point among said route points on a boundary of or within said set process area wherein said recovery route searching process searches a recovery route from the present position of said movable body to said searched closest route point.

2. A route setting method according to claim 1, wherein said process area setting process sets said process area so that a process time required for said recovery route searching process is within a predetermined range of time.

3. A route setting method according to claim 1, wherein said process area setting process sets a circular area having a center thereof at the present position of said movable body, as said process area.

4. A route setting method according to claim 1, wherein said process area setting process comprises an inputting process of inputting a command to set said process area, and sets said process area in case that said command is inputted by said inputting process.

5. A route setting method according to claim 1, wherein said process area setting process comprises a detecting process of detecting whether or not the present position of said movable body exists on said set route, and sets said process area in case that the present position of said movable body does not exist on said set route according to a detection result of said detecting process.

6. A route setting apparatus for use in a navigation system for navigating a movable body, said route setting apparatus comprising:

a process area setting means of setting a process area, which corresponds to a present position of said movable body, includes a plurality of route points and has a size based on a performance of a recovery route searching means, in case that the present position of said movable body does not exist on a set route from an original departure point to a final destination point, said set route including said route points and being set in advance; and a route point searching means of searching a closest route point, which is the closest to said final destination point among said route points on a boundary of or within said set process area wherein said recovery route searching means searches a recovery route from the present position of said movable body to said searched closest route point.

7. A route setting apparatus according to claim 6, wherein said process area setting means sets said process area so that a process time required for said recovery route searching means is within a predetermined range of time.

8. A route setting apparatus according to claim 6, wherein said process area setting means sets a circular area having a center thereof at the present position of said movable body, as said process area.

9. A route setting apparatus according to claim 6, wherein said process area setting means comprises an inputting means of inputting a command to set said process area, and sets said process area in case that said command is inputted by said inputting means.

10. A route setting apparatus according to claim 6, wherein said process area setting means comprises a detecting means of detecting whether or not the present position of said movable body exists on said set route, and sets said process area in case that the present position of said movable body does not exist on said set route according to a detection result of said detecting means.

11. A program storage device readable by a route setting apparatus for use in a navigation system for navigating a movable body, tangibly embodying a program of instructions executable by said route setting apparatus to perform method processes for setting a recovery route, said method processes comprising:

a process area setting process of setting a process area, which corresponds to a present position of said movable body, includes a plurality of route points and has a size based on a performance of a recovery route searching process, in case that the present position of said movable body does not exist on a set route from an original departure point to a final destination point, said set route including said route points and being set in advance; and a route point searching process of searching a closest route point, which is the closest to said final destination point among said route points on a boundary of or within said set process area wherein said recovery route searching process searches a recovery route from the present position of said movable body to said searched closest route point.

12. A program storage device according to claim 11, wherein said process area setting process sets said process area so that a process time required for said recovery route searching process is within a predetermined range of time.

13. A program storage device according to claim 11, wherein said process area setting process sets a circular area having a center thereof at the present position of said movable body, as said process area.

* * * * *